United States Patent
Bresler et al.

[15] 3,705,345
[45] Dec. 5, 1972

[54] METHOD OF INVESTIGATION OF ELECTRONIC PARAMAGNETIC RESONANCE

[72] Inventors: Semen Efimovich Bresler, Lesnoi prospekt, 61, kv. 244; Embek Nikolaevich Kazbekov, prospekt Morisa Toreza, 9, kv. 8, both of Leningrad; Viktor Nikolaevich Fomichev, prospekt 25 Oktyabrya, 49, kv. 4, Gatchina, Leningradoskoi oblasti, all of U.S.S.R.

[22] Filed: Feb. 12, 1970

[21] Appl. No.: 10,726

[52] U.S. Cl. ...................................324/0.5 R
[51] Int. Cl. ..................................G01n 27/78
[58] Field of Search ......324/0.5, 58 A, 58 C, 58.5 A, 324/58.5 C; 333/24 G

[56] References Cited

UNITED STATES PATENTS 3,103,627  9/1963  Schneider............324/58.5 A

*Primary Examiner*—Michael J. Lynch
*Attorney*—Waters, Roditi, Schwartz & Nissen

[57] ABSTRACT

A method of investigation of electronic paramagnetic resonance whereby a specimen under test placed within a balanced cavity resonator is exposed simultaneously to an external permanent magnetic field of variable intensity and a microwave field, the magnetic intensity vector of the latter being at an angle of 45° to the intensity vector of the external magnetic field.

When the conditions for resonance are established, the plane of polarization of microwave oscillations rotates and the measured level of the microwave signal changes.

2 Claims, 1 Drawing Figure

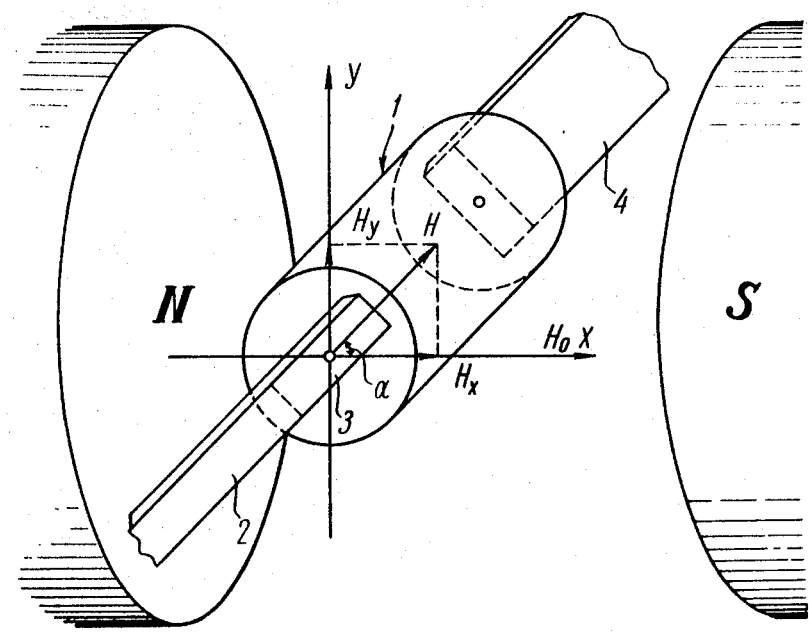

3,705,345

METHOD OF INVESTIGATION OF ELECTRONIC PARAMAGNETIC RESONANCE

The present invention relates to a method of investigation of electronic paramagnetic resonance and can be used for resonance investigation of the structure of substances, and physical, chemical and biological processes, etc.

According to known methods of investigation of paramagnetic resonance, the specimen is placed within the cavity of a resonator and an electromagnetic microwave field is excited in the latter. Simultaneously the specimen is exposed to an external permanent magnetic field of variable intensity. The resonator is arranged in the permanent field so that the magnetic intensity vector of the microwave field is perpendicular to the intensity vector of the external magnetic field. When a definite relation is observed between the intensity of the permanent field and the frequency of the microwave field (the condition for paramagnetic resonance) the specimen under test begins to absorb the energy of the microwave field. The variation of the microwave energy at the output of the cavity is measured by means of detectors coupled to the cavity resonator.

When use is made of this method the sensitivity of the existing spectrometers which employ low-power sources of microwave energy is insufficient, especially when the specimen to be investigated has large dielectric losses. This imposes considerable limitations on the kind and number of objects which can be investigated using the method of electronic paramagnetic resonance.

Attempts to raise the sensitivity of the spectrometer by increasing the power of the microwave source to above 1 mW proved to be of no avail because the amplitude and frequency noise grows stronger as the strength of the useful signal is increased.

An object of the present invention is to obviate the above drawback by providing a method of paramagnetic resonance investigation of energy absorption by specimens wherein the noise of the microwave source does not limit the permissible power level of said source.

With this object in view a method of paramagnetic resonance investigation is devised whereby a specimen placed within a balanced cavity resonator with angle-degenerative plane-polarized waves is exposed to a microwave field excited in this cavity and to an external permanent magnetic field of variable intensity, and the amount of paramagnetic absorption by the specimen at resonance is measured, the intensity vector of said microwave field according to the invention being at an acute angle to the intensity vector of said external permanent magnetic field.

It is most preferable that the magnetic intensity vector of the microwave field excited in the cavity is at an angle of 45° to the intensity vector of the external field.

When this method is used, the plane of polarization of the waves rotates and, consequently, the power level of the microwave field measured by a detector changes depending on the amount of microwave energy absorbed by the specimen.

In this case rotation of the plane of polarization of the waves and, consequently, the power level to be measured do not depend on the noise of the microwave energy source, which, therefore, may have a large power.

The invention will be better understood from the description of an embodiment given by way of example with reference to the accompanying drawing the sole FIGURE of which is a schematic perspective view of a device for investigating electronic paramagnetic resonance wherein the balanced resonator is a cylindrical cavity resonator operating in the $H_{11n}$ mode.

A cavity 1 is placed in a permanent magnetic field $H_o$, produced by an external magnet NS. The cavity 1 is so disposed that its symmetry axis is perpendicular to the direction of the external magnetic field. The specimen under test (not shown in the figure) is placed within the cavity and then plane-polarized microwave oscillations are excited, the magnetic intensity vector H of which is at an angle of about 45° to the direction of the permanent magnetic field.

The balanced cavity resonator may be a rectangular cavity of square cross-section operated in the $H_{10n}$ mode, a spherical cavity operated in the $H_{01}$ mode or any other cavity with plane-polarized angle-degenerative waves.

The cavity is excited from a source of microwave energy (not shown in the drawing) through a waveguide 2 and a diaphragm 3 mounted on the end or on the side surface of waveguide 2. The cavity may be likewise excited by a rod and a coaxial line.

After microwave oscillations have been excited the cavity is balanced so that no microwave energy reaches a receiving detector (not shown in the drawing) until resonance is established. Such balancing may be accomplished by appropriate relative positioning of exciting and receiving waveguides 2 and 4. The vector H can be resolved into two vectors $H_x$ and $H_y$, one parallel and the other perpendicular to vector $H_o$. As the oscillations of the $H_{11n}$ mode are degenerative with respect to the angle $\alpha$, the vectors $H_x$ and $H_y$ are equal to each other for any frequency of the microwave oscillations.

After the cavity has been balanced, the intensity of the external magnetic field is varied until the conditions for paramagnetic resonance are established. Paramagnetic absorption of the specimen under test reduces the amplitude of oscillation in the plane Y while the oscillation amplitude in the plane X remains unchanged as the vector $H_x$ is parallel to the vector $H_o$. Consequently, at the moment paramagnetic resonance occurs the plane of polarization of resultant oscillations rotates (the cavity is unbalanced), as a result of which a microwave signal arrives at the detector, the level of the signal being used to estimate the magnitude of the electronic paramagnetic resonance signal.

The angle $\alpha = 45°$ between the magnetic intensity vector of the microwave field and the magnetic intensity vector of the external magnetic field is optimal for obtaining the highest sensitivity by the method described herein. The use of any other angles between said vectors within the range from 0° to 90° (excepting 0° and 90°) though possible is unadvisable as the sensitivity drops in proportion to $\sin 2\alpha$.

The method described herein improves the concentration sensitivity of an electronic paramagnetic resonance spectrometer, which, for an aqueous solution of $Mn^{++}$ ions, is as high as $10^{-8}$ mole per liter with a microwave source power of 1 W. This exceeds by at least one order of magnitude the sensitivity of the best types of existing spectrometers.

The sensitivity may be markedly increased by the use of sources of greater power as the higher noise level of the source resulting from its increased power does not increase the noise affecting the detector.

What is claimed is:

1. A method of investigation of paramagnetic resonance, comprising placing a specimen under test within a balanced cavity resonator with angle-degenerative plane-polarized waves, exposing said specimen to an external permanent magnetic field of variable intensity and to a microwave field excited within said cavity resonator so that the magnetic intensity vector of said microwave field is at an acute angle relative to the magnetic intensity vector of said external magnetic field, as a result of which the plane of polarization of microwave oscillations rotates when the conditions for resonance are established, and then measuring the microwave oscillations, their power level being used to estimate the magnitude of paramagnetic resonance.

2. A method as claimed in claim 1, comprising disposing the magnetic intensity vector of the microwave field at an angle of 45° to the magnetic intensity vector of the external magnetic field.

* * * * *